(12) United States Patent
Baek

(10) Patent No.: US 10,423,470 B2
(45) Date of Patent: Sep. 24, 2019

(54) METHOD AND APPARATUS FOR PROVIDING DIARY SERVICE IN ELECTRONIC DEVICE

(71) Applicant: Samsung Electronics Co., Ltd., Gyeonggi-do (KR)

(72) Inventor: Sangchul Baek, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 686 days.

(21) Appl. No.: 14/624,324

(22) Filed: Feb. 17, 2015

(65) Prior Publication Data

US 2015/0235176 A1    Aug. 20, 2015

(30) Foreign Application Priority Data

Feb. 17, 2014 (KR) ........................ 10-2014-0017769

(51) Int. Cl.
| | | |
|---|---|---|
| *G06F 9/54* | (2006.01) | |
| *G06Q 10/10* | (2012.01) | |
| *G06F 3/0488* | (2013.01) | |
| *G06F 3/0484* | (2013.01) | |

(52) U.S. Cl.
CPC ............ *G06F 9/543* (2013.01); *G06F 3/0484* (2013.01); *G06F 3/04883* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 8,261,213 B2* | 9/2012 | Hinckley | G06F 3/03545 715/769 |
| 2008/0274722 A1 | 11/2008 | Kim | |
| 2012/0096368 A1* | 4/2012 | McDowell | G06F 9/543 715/748 |
| 2013/0124973 A1* | 5/2013 | Piccionelli | G06F 17/2247 715/234 |
| 2014/0013258 A1* | 1/2014 | Jang | G06F 3/0488 715/770 |
| 2014/0253465 A1* | 9/2014 | Hicks | G06F 3/03545 345/173 |
| 2015/0026620 A1* | 1/2015 | Kwon | G06F 3/04845 715/770 |

FOREIGN PATENT DOCUMENTS

| | | |
|---|---|---|
| KR | 10-0823234 | 4/2008 |
| KR | 10-1373281 | 3/2014 |

* cited by examiner

*Primary Examiner* — Christopher J Fibbi

(57) ABSTRACT

A method and an apparatus for generating a diary in an electronic device is provided. The method includes displaying an application execution screen, collecting and storing information through an electronic pen in the application execution screen, and generating and displaying a diary from the stored information when it is a predetermined time. Therefore, a diary is automatically generated, and thus convenience can be improved.

13 Claims, 12 Drawing Sheets

METHOD AND APPARATUS FOR PROVIDING DIARY SERVICE IN ELECTRONIC DEVICE

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2014-0017769, filed on Feb. 17, 2014, which is hereby incorporated by reference for all purposes as if fully set forth herein.

TECHNICAL FIELD

Various embodiments of the present application relates to a method and an apparatus for providing a diary service in an electronic device.

BACKGROUND

Recently, because of a remarkable development of an information communication technology, a semiconductor technology, and the like, propagation and a use of various electronic devices have quickly increased. For example, the number of types of the electronic devices such as a cellular phone, a digital camera, a Personal Digital Assistant (PDA), an MP3 player, a Portable Multimedia Player (PMP), a broadcast receiver, a navigation, an electronic dictionary, and the like is too many to count. Specially, recent electronic devices have reached a mobile convergence stage including domains of other electronic devices rather than staying in each traditional and inherent domain thereof. Additionally, various functions such as a picture photographing, a video call, a multimedia data communication, a wireless Internet, a short-range wireless communication, a mobile broadcast receiver and a diary writing are newly added to the cellular phone, and thus their utilities are increased. In order to write a diary, a user executes a diary application among the various utilities and directly inputs contents of the diary. When the user directly inputs the contents of the diary, the user only has to input text or has to insert a simple image.

SUMMARY

A method in which a user executes a diary application and the user inputs contents of a diary in the executed diary application so that the user writes the diary in an electronic device. A diary written through such a method is limited in which the contents of the diary are primarily formed as text or a simple image.

In addition, there are difficulties in continuously writing a diary by a user. Because of the inconvenience that the user should execute a diary application at least once a day to write a diary and bring back a memory of the user. In addition, when a written diary is shared using an SMS, there is the inconvenience that privacy is exposed.

To address the above-discussed deficiencies, it is a primary object to provide a method and an apparatus capable of automatically generating a diary of a magazine form from a text, a picture, an image, and the like using an electronic pen needless to write the diary by devoting a separate time in an electronic device. Thus, an electronic device can synthetically display what a user thinks, contents of what a user consumes, and contents of what a user manufactures every day.

In addition, a method and an apparatus capable of sharing a diary of a magazine form generated in an electronic device for desiring people are proposed. A method and an apparatus in which a diary is shared in connection with an electronic device such as a refrigerator, a smart phone, and a tablet capable of applying an electronic pen when the diary is shared with desiring people are proposed.

According to an aspect of the present disclosure, the present disclosure includes displaying an application execution screen, collecting and storing information through an electronic pen in the application execution screen, and generating and displaying a diary from the stored information when it is a predetermined time.

According to another aspect of the present disclosure, the present disclosure includes a storage unit that temporarily stores information for generating a diary, a touch panel and a sensor unit that senses a predetermined gesture to determine the predetermined gesture as information, and a control unit that determines the predetermined gesture as the information and store the information when the predetermined gesture is sensed through an electronic pen in an application execution screen, generates and displays the diary from the stored information when it is a predetermined time.

An electronic device according to an embodiment of the present disclosure can automatically generate a diary that is difficult for a user to consistently write every day. The automatically generated diary can record the life of the user. In addition, the user can share the diary with another desiring electronic device without the use of a mobile communication network, and can conveniently use the diary as a family newspaper or a pictorial.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
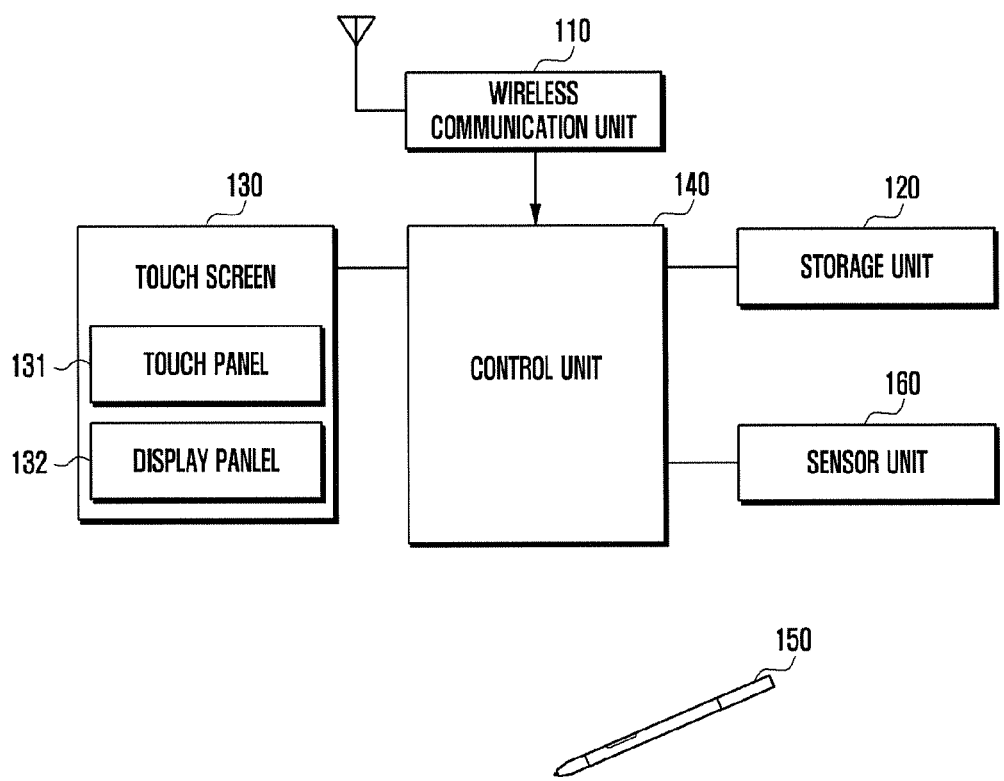
FIG. 1 illustrates a configuration of an electronic device capable of generating a diary according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various embodiments will be described with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

In certain embodiments, the term 'information' may be contents that can be written as a diary. For example, the contents can include a text, an image, a video, a voice file, an Internet execution screen, e-book execution screen, and the like. The diary is a recording of the daily life of a user. Only information to be input by a user while the user uses a portable terminal is constructed and displayed as a diary. The information that can be written as the diary is determined by a predetermined gesture input received from a user. When the predetermined gesture input is sensed, the gesture is determined as the information, and an address corresponding to a 'shortcut' to corresponding contents is temporarily stored.

FIG. 1 is a view schematically illustrating a configuration of an electronic device capable of generating a diary according to an embodiment of the present disclosure.

Referring to FIG. 1, the electronic device includes a wireless communication unit 110, a storage unit 120, a touch screen 130, a control unit 140, an electronic pen 150 and a sensor unit 160.

The wireless communication unit 110 includes one or more modules that enable a wireless communication between the electronic device and a wireless communication system or the electronic device and a network including another electronic device. For example, the wireless communication unit 110 can include a mobile communication module, a Wireless Local Area Network (WLAN) module, a short-range communication module, a location calculating module, a broadcast receiving module, and the like. Specially, in embodiments of the present disclosure, the wireless communication unit 110 performs an ad-hoc connection to share the generated diary with the other electronic device.

The storage unit 120 stores a program for the electronic device. The storage unit 120 also stores an application installed in the electronic device. Specifically, in embodiments of the present disclosure, the storage unit 120 stores a diary application. In addition, the storage unit 120 stores information collected in order to automatically, namely without additional user action, generate the diary.

The touch screen 130 includes a touch panel 131 and a display panel 132.

When a user's input is generated, the touch panel 131 transfers the user input to the control unit 140. Here, the user's input can be an input request through an electronic pen or a user's finger. Specially, in embodiments of the present disclosure, the touch panel 131 senses a gesture predetermined for collecting the information of the diary in application execution state.

The display panel 132 displays a screen data received from the control unit 140. Specially, in embodiments of the present disclosure, the display panel 132 displays the automatically generated diary.

The control unit 140 controls overall operations of the electronic device. The control unit 140 displays an application execution screen stored in a portable terminal. The control unit 140 collects the information for generating the diary in a state in which the application execution screen is displayed. When the control unit 140 senses the gesture predetermined for collecting the information, the control unit 140 determines the gesture as the information. Here, the gesture predetermined for collecting the information includes an operation such as a drag using an electronic pen 150, a long touch, a physical button input, a physical button input at a fixed position for a long time, and a hovering. When the control unit 140 senses such a predetermined gesture, the control unit 140 determines the gesture as the information for generating the diary. As a result of the determination, the control unit 140 stores the information for generating the diary in the storage unit 120. Next, when it is a predetermined time for automatically generating the diary, the control unit 140 automatically generates the diary using the information stored in the storage unit 120. At this time, the information stored in the storage unit 120 through the gesture predetermined for collecting the information by a user can be displayed in the diary. In addition, when the generated diary is shared with the other electronic device, the control unit 140 displays the diary together with a diary of the other electronic device.

The electronic pen 150 is a device supporting a touch function in connection with the electronic device 100. For example, the electronic pen 150 can be an S-pen. The S-pen senses an input of a tip (including a contact unit directly physically contacting with a screen when a touch is generated and lengthily built in an internal center of the S-pen) and supports a specific function corresponding to each input. In addition, the electronic pen includes a physical button.

The sensor unit 160 senses a gesture input using the electronic pen 150. The gesture can be an operation such as a physical button input and a hovering.

Figure 2:
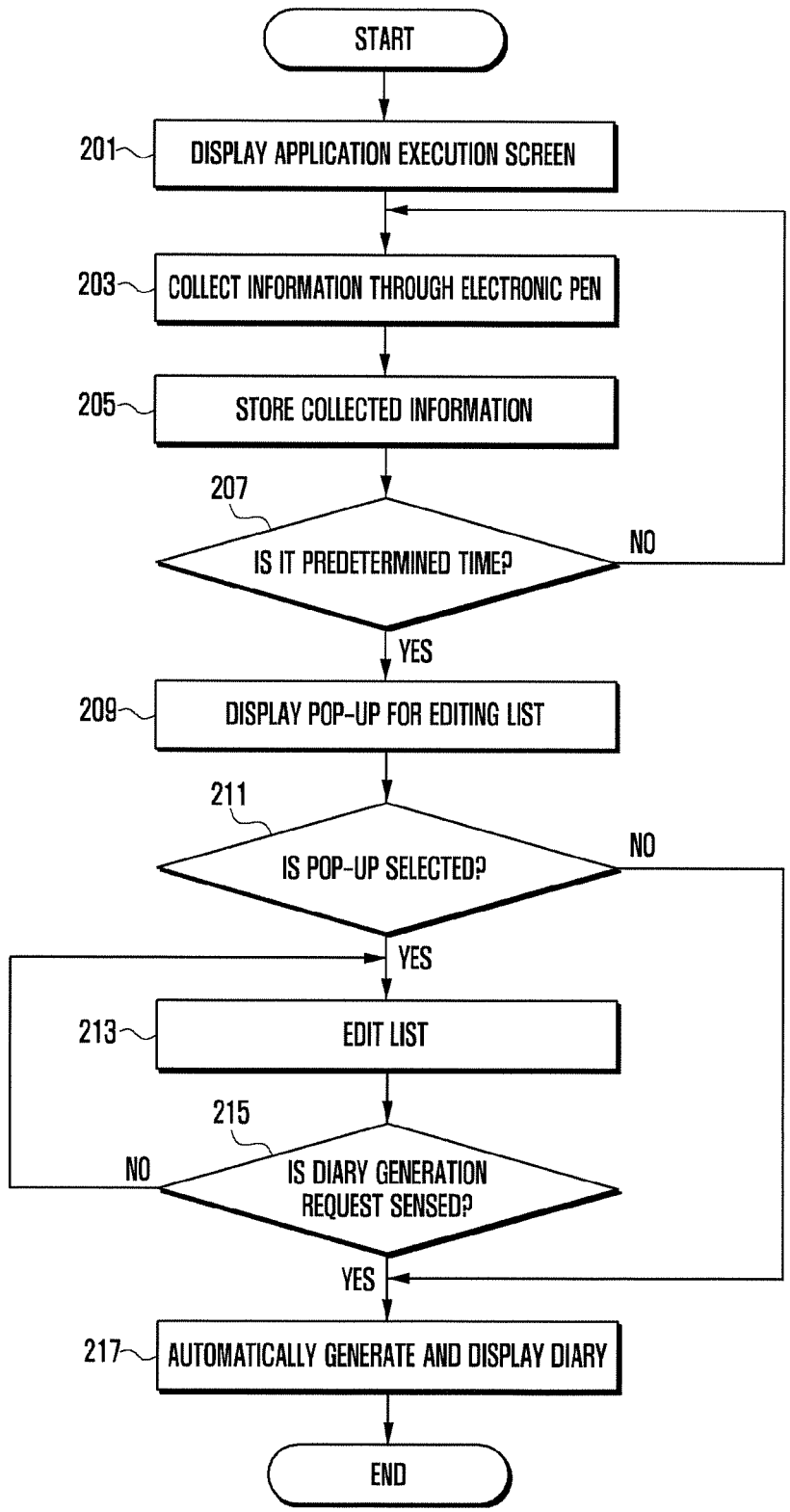
FIG. 2 illustrates a procedure for generating a diary in an electronic device according to an embodiment of the present disclosure.

FIG. 2 is a view illustrating a procedure for generating the diary in the electronic device according to an embodiment of the present disclosure.

Referring to FIG. 2, in step 201, the control unit 140 displays an application execution screen. Here, the application refers to an application installed and stored in a portable terminal. For example, the application can include a scheduler, a memo, an e-book, an Internet application, and the like. In step 203, the control unit 140 collects the information in the state in which the application execution screen is displayed. Here, the information is the contents for forming the diary. For example, the information can include a text, an image, a video, a voice file, an Internet execution screen, an e-book execution screen, and the like. When the control unit 140 senses the input of the gesture predetermined for collecting the information by the user in the state in which the application ("app") execution screen is displayed, the control unit 140 determines and collects a corresponding screen as the information. Here, the gesture predetermined for collecting the information can be the gesture input using the electronic pen 150, and can be a drag, a long touch, a physical button input, a physical button input at a fixed position for a long time, a hovering, and the like. In addition, in step 205, the control unit 140 stores the collected information in the storage unit 120. When the control unit 140 stores the information, the control unit 120 temporarily stores an address corresponding to a 'shortcut' to a corresponding portion (or screen) in the storage unit 120. When the information is stored, as described above, the control unit 140 stores, in the storage unit 120, the information for a predetermined time (e.g., 24 hours). Next, in step 207, the control unit 140 checks to determine if a current time is a predetermined time (e.g., a midnight) in order to automatically generate the diary. Until the predetermined time, the control unit 140 repeats the processes of collecting and storing the information as described above. Thus, the control unit 140 repeats the processes of collecting the information and storing the collected information until a current time is the same as the predetermined time.

Meanwhile, in step 207, when a current time is the same as the predetermined time, the control unit 140 senses that the current time matches the predetermined time, and in step 209, the control unit 140 displays a pop-up. The pop-up can be set in order to ask whether a list of the information forming the diary is edited or not. In step 211, when the pop-up is selected, the control unit 140 senses the selection. In step 213, the control unit 140 edits the list displaying the temporarily stored information. Here, the list displays an edit item in list edit screen. That is, when the control unit 140 senses the pop-up selection, the control unit 140 executes the diary application and edits the list of the stored information through a selection of the edit item. Here, the stored information can be information temporarily stored by the control unit 140 whenever the control unit 140 senses the gesture predetermined for collecting the information. The gesture predetermined for collecting the information can be generated by the electronic pen 150. The control unit 140 senses the gesture generated by the electronic pen. The control unit 140 generates the diary from only information desired by a user. The control unit 140 finishes the list edition through such a process. In step 215, the control unit 140 senses a request for generating the diary, in step 217, the control unit 140 automatically generates the diary using the edited information.

In an embodiment, in step 211, when the control unit 140 does not sense the pop-up selection, in step 217, the control unit 140 automatically generates and displays the diary using the collected information.

Figure 3:
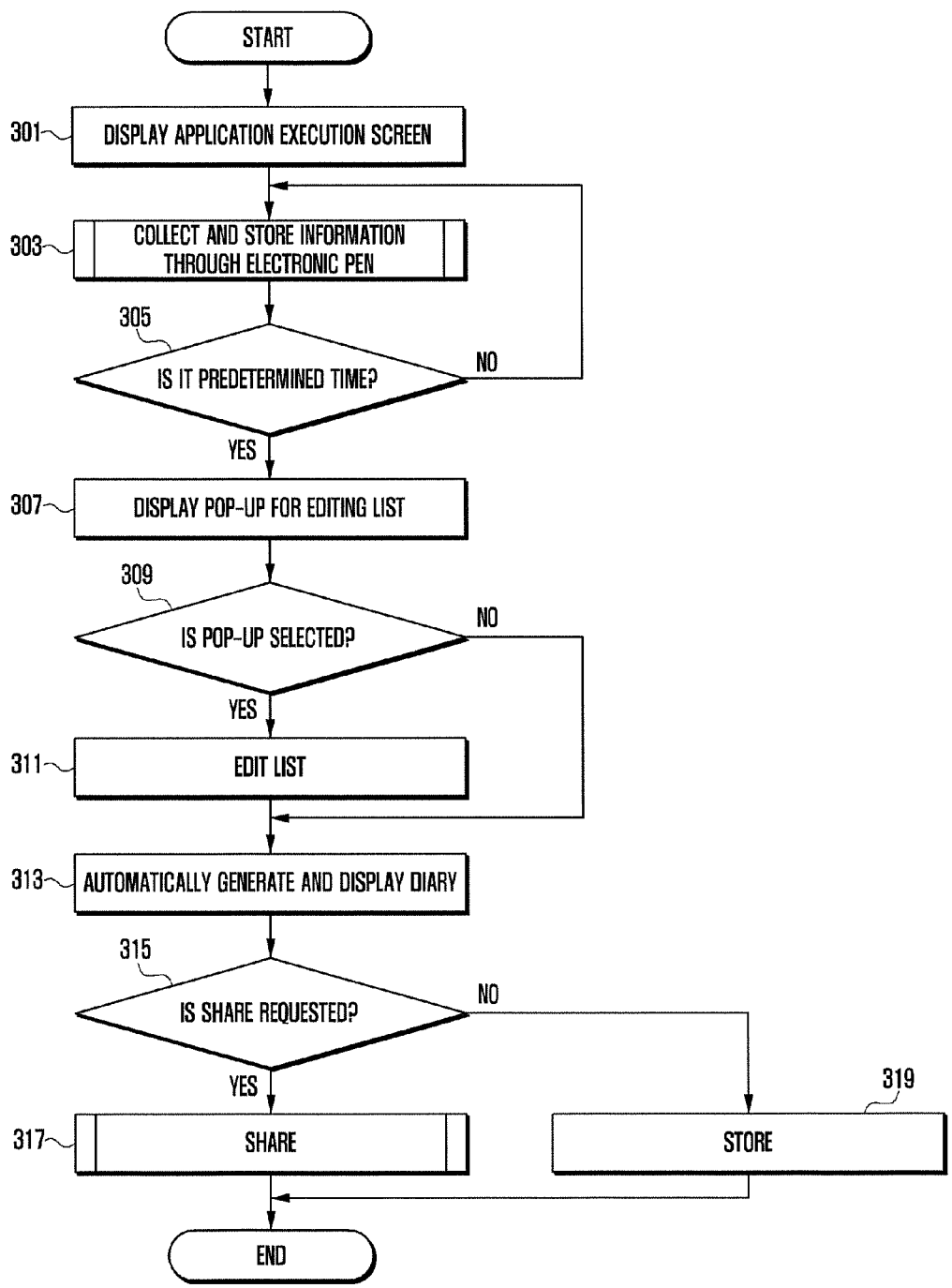
FIG. 3 illustrates a procedure for generating a diary in an electronic device according to an embodiment of the present disclosure.
Figure 4A:
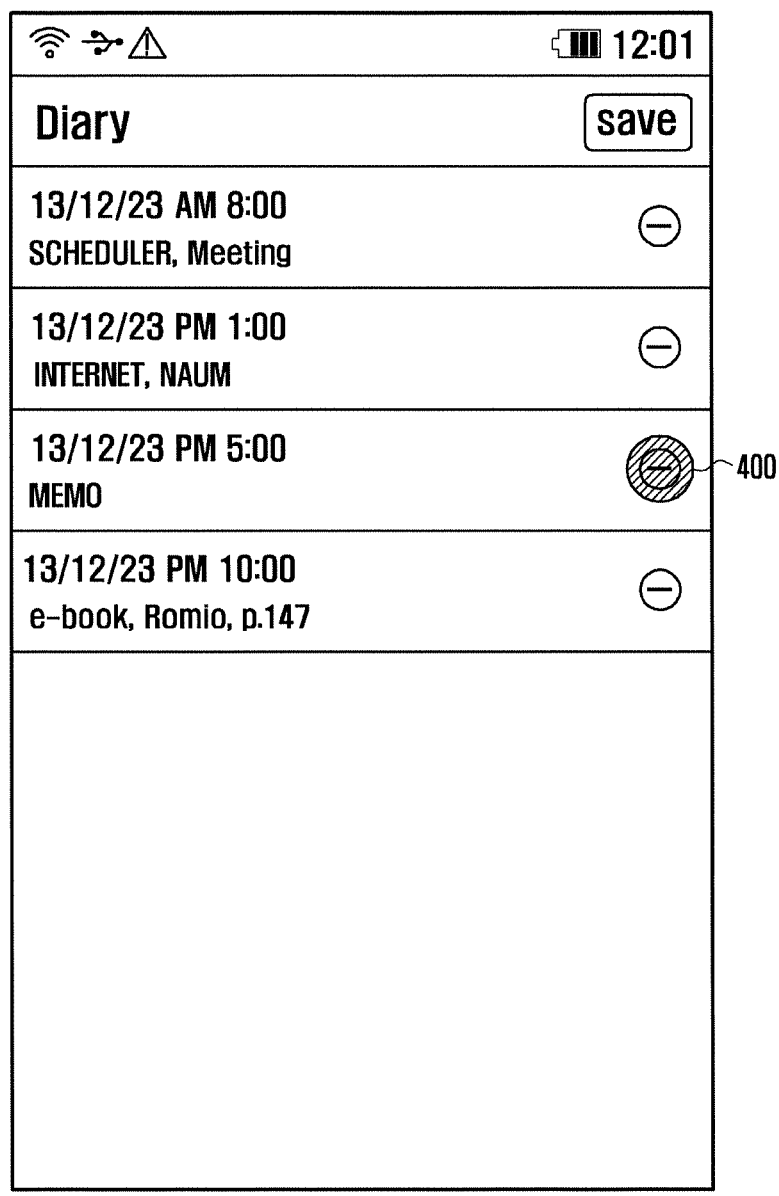
FIGS. 4A and 4B illustrate an example of a screen in which a diary is generated in an electronic device according to an embodiment of the present disclosure.
Figure 4B:
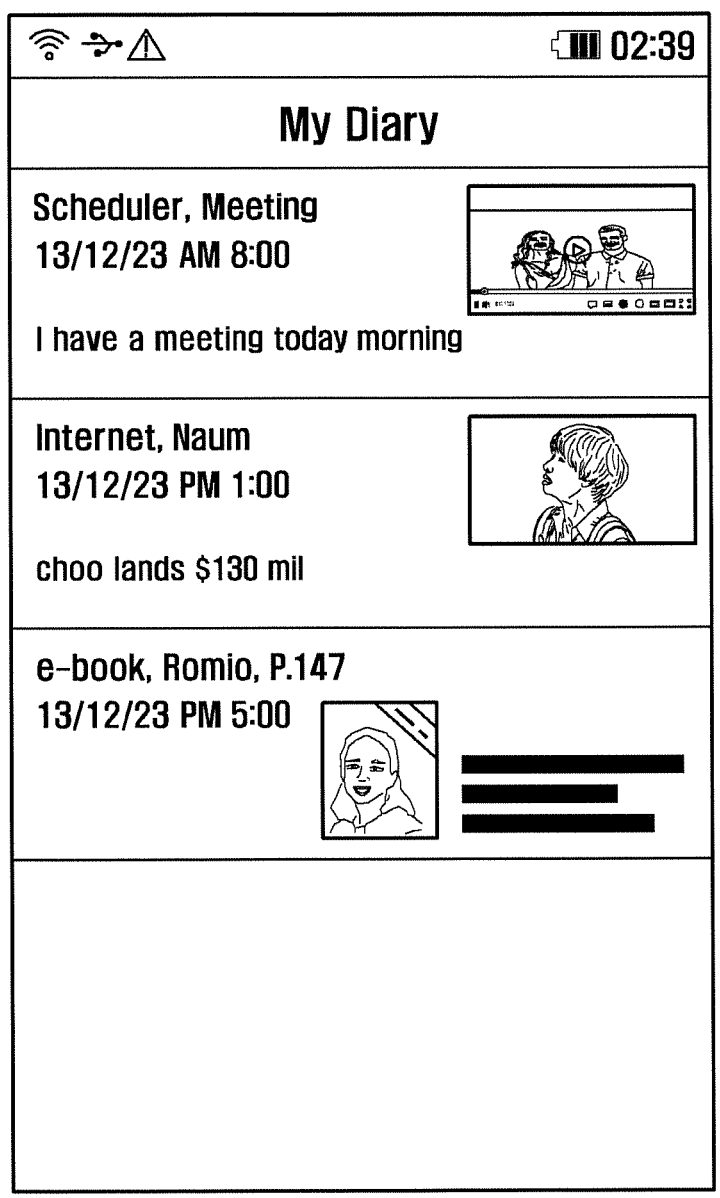

FIG. 3 is a view illustrating a procedure of generating a diary in an electronic device according to an embodiment of the present disclosure. FIGS. 4A and 4B are views illustrating an example of a screen in which a diary is generated in an electronic device according to an embodiment of the present disclosure.

Referring to FIGS. 3, 4A and 4B, in step 301, the control unit 140 displays an application execution screen. Here, an application can be an application installed and stored in a portable terminal, and can be executed by a user. In step 303, the control unit 140 collects information through the electronic pen 150 and stores the collected information in the storage unit 120 in a state in which the application is executed. Here, the information can be contents forming a generated diary when the diary is generated, and the information can be collected by an input of a gesture predetermined for collecting the information by the user. Here, the gesture predetermined for collecting the information can be a gesture input through the electronic pen 150, and can be a drag, a long touch, a physical button input, a physical button input at a fixed position for a long time, a hovering and the like.

Figure 5:
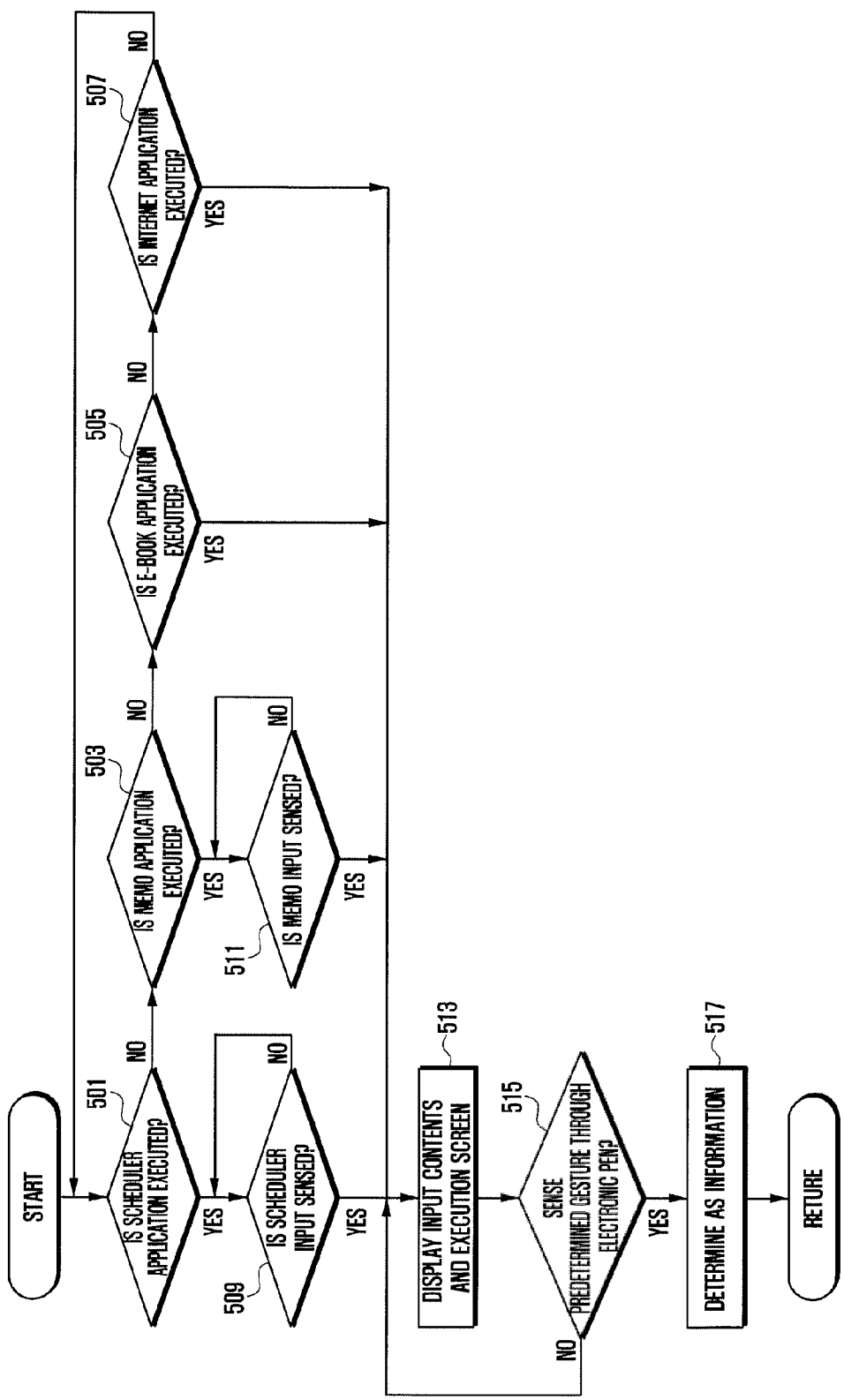
FIG. 5 illustrates a procedure for collecting information in order to generate a diary in an electronic device according to an embodiment of the present disclosure.

FIG. 5 is a view illustrating a procedure of collecting information in order to generate a diary in an electronic device according to an embodiment of the present disclosure. FIGS. 6A to 6D are views illustrating an example of a screen in which information is collected in order to generate a diary in an electronic device according to an embodiment of the present disclosure.

Referring to FIGS. 5 and 6A to 6D, in step 501, the control unit 140 checks whether a scheduler application is executed. When the control unit 140 determines the execution of the scheduler application, in step 509, the control unit 140 senses an input executed in a scheduler, and in step 513, the control unit 140 displays a screen corresponding to the sensed input. For example, the screen corresponding to the sensed input can be a screen of a state in which a user inputs a schedule to the scheduler.

Figure 6A:
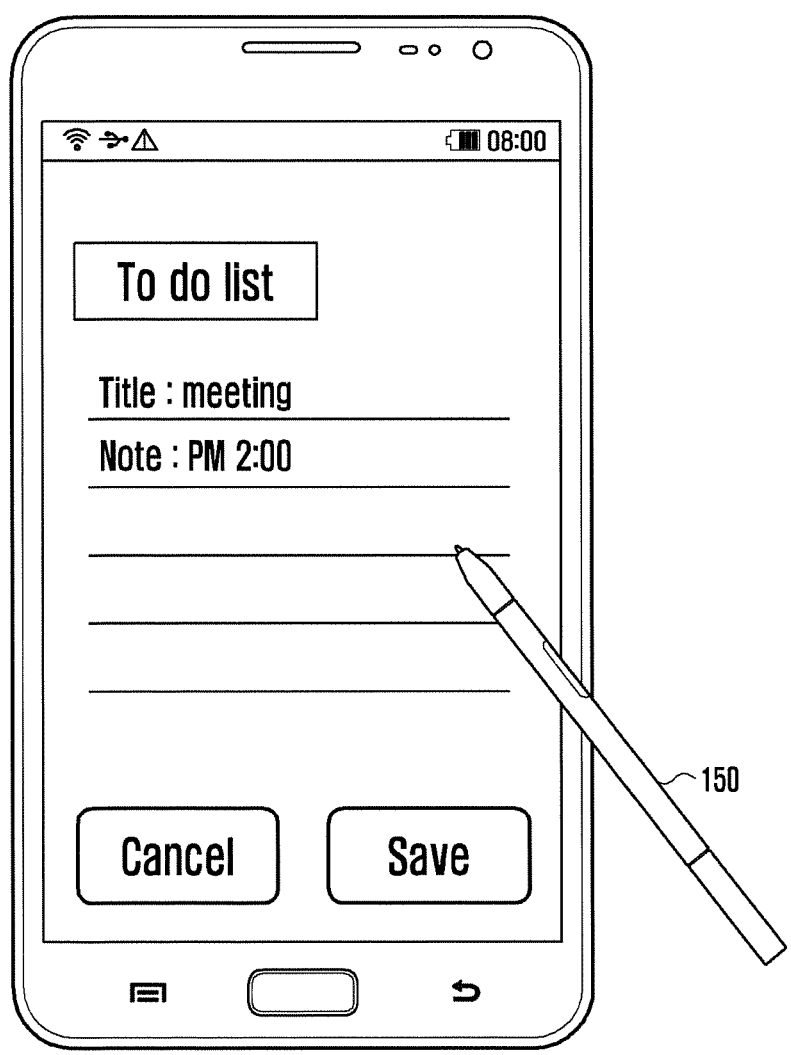
FIGS. 6A, 6B, 6C and 6D illustrate examples of a screen in which information is collected in order to generate a diary in an electronic device according to an embodiment of the present disclosure.

In step 515, the control unit 140 determines a gesture predetermined for collecting the information is sensed in the state in which the screen corresponding to the sensed input is displayed. Here, the gesture for collecting the information can be a drag input through the electronic pen 150, a long touch, a physical button input, a physical button input in a fixed position for a long time, a hovering, and the like. FIG. 6A is an example of a screen in which the gesture predetermined for collecting the information is sensed. Specifically, when a scheduler screen is displayed as shown in FIG. 6A, the control unit senses a user's input (e.g., a meeting plan input). The control unit 140 senses the gesture (e.g., a long touch through the electronic pen 150) predetermined for collecting the information in a state in which a screen corresponding to the user's input is displayed as shown in FIG. 6A.

When the control unit 140 does not sense the gesture predetermined for collecting the information, the procedure is progressed to before step 513, and the control unit 140 maintains a state in which the contents input from the scheduler is displayed. Meanwhile, when the control unit 140 senses the gesture predetermined for collecting the information, in step 517, the control unit 140 determines the gesture as the information for forming the diary. When the control unit 140 determines the gesture as the information, the control unit 140 temporarily stores the address of a corresponding scheduler.

Figure 6B:
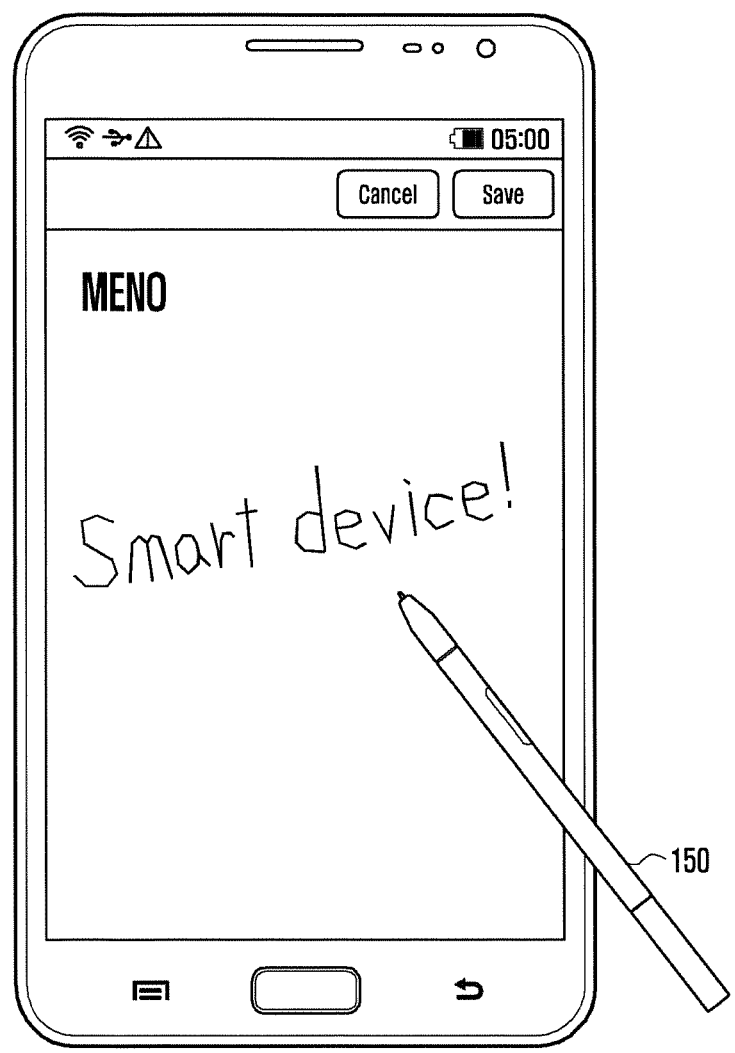

In an embodiment, in step 501, when the control unit 140 does not sense the execution of the scheduler application, in step 503, the control unit 140 senses whether a memo application is executed. When the control unit 140 determines the execution of the memo application, in step 511, the control unit 140 checks whether a user's input is sensed on the memo application. Next, in step 513, the control unit 140 displays contents input by the user on a screen in which the memo application is executed. In step 515, the control unit 140 checks whether the gesture predetermined for collecting the information is sensed in the state in which the contents input to the memo application is displayed. Here, the gesture predetermined for collecting the information can be a predetermined gesture that is input through the electronic pen 150. FIG. 6B is an example of a screen in which the predetermined gesture is sensed using the electronic pen 150 in the screen in which the memo application is executed. Specifically, when the control unit 140 senses the gesture predetermined for collecting the information, in step 517, the control unit 140 determines the gesture as the information for forming the diary. When the control unit 140 determines the gesture as the information, the control unit 140 temporarily stores an address of a corresponding memo.

In an embodiment, in step 503, when the control unit 140 does not sense the execution of the memo application, in step 505, the control unit 140 determines whether an e-book is executed. In step 505, when the control unit 140 senses the execution of the e-book, in step 513, the control unit 140 displays a screen in which the e-book is executed. In step 515, when the control unit 140 senses the gesture predetermined for collecting the information through the electronic pen 150 at a specific portion, in step 517, the control unit 140 determines the gesture as the information for forming the diary.

Figure 6C:
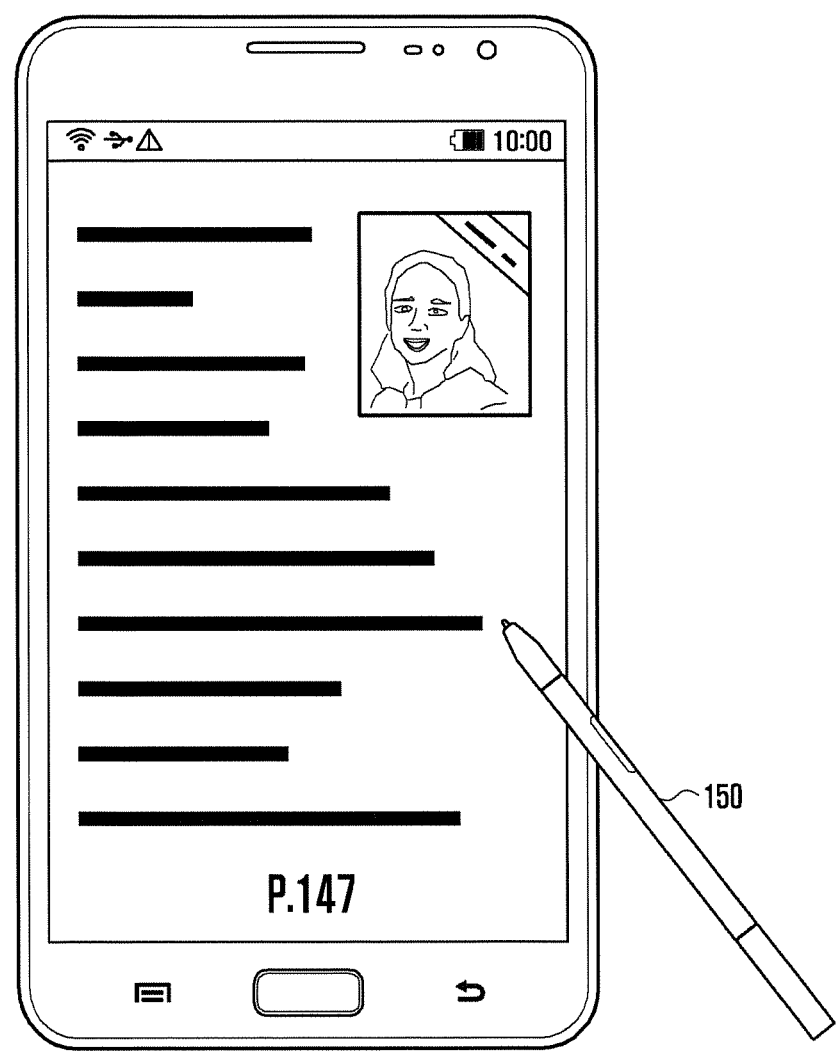

FIG. 6C is an example of a screen in which the gesture predetermined for collecting the information is sensed in the e-book execution screen. The control unit 140 temporarily stores an address of the e-book execution screen in which the gesture predetermined for collecting the information is sensed.

Figure 6D:
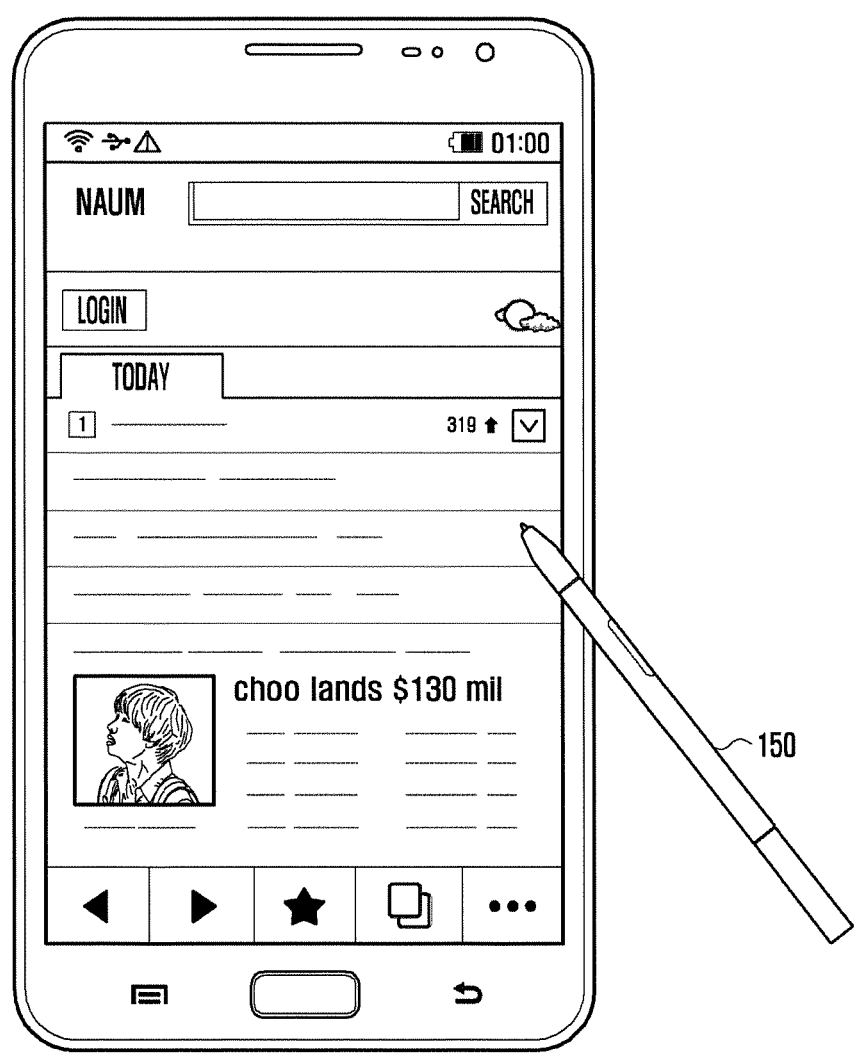

In an embodiment, in step 507, when the control unit 140 senses an execution of an Internet application, in step 513, the control unit 140 displays a screen corresponding to the application execution. The control unit 140 displays a screen corresponding to a user's input when the control unit 140 displays the screen in which the Internet application is executed. At this time, in step 515, the control unit 140 determines whether the gesture predetermined for collecting the information is sensed. The gesture predetermined for collecting the information can be generated through the electronic pen 150. When the control unit 140 senses the gesture predetermined for collecting the information, in step 517, the control unit 140 determines contents of a corresponding screen as the information for forming the diary. At this time, the control unit 140 temporarily stores a shortcut address of the corresponding screen. FIG. 6D is an example of a screen displaying the predetermined gesture in the screen in which the Internet application is executed.

In the above description, the application execution screen, for example, can be a scheduler, a memo, an e-book, Internet and the like, but, the application execution screen is not limited thereto, and can be all applications stored in the electronic device.

In a state in which the information is stored through the above-mentioned processes, in step 305, the control unit 140 checks whether it is a predetermined time. Here, the predetermined time is a time set for automatically generating the diary. The predetermined time can be set in a step of manufacturing the electronic device, a step of installing the diary application and a step of setting by a user. When it is the predetermined time, in step 305, the control unit 140 senses this, and in step 307, the control unit 140 displays the pop-up. Here, the pop-up is an inquiry asking whether the list of the information forming the diary is edited. In step 309, when the control unit 140 selects the pop-up in a state in which the pop-up is displayed, in step 311, the control unit 140 edits the list. Here, the list can be a list displaying the temporarily stored information, and the information can be edited by a user's intention. At this time, the control unit 140 displays the edit item together with the list of the stored information. FIG. 4A is an example of a list screen displaying the temporarily stored information. When the control unit 140 senses a selection of an edit item 400 in the list displaying the information before generating the diary as shown in FIG. 4A, the control unit 140 can individually exclude the information to be generated as the diary.

Next, in step 313, the control unit 140 automatically generates and displays the diary using the edited information. FIG. 4B is an example of a screen displaying the diary generated using the edited information. The diary generated as described above can be formed of a text, an image, a video, a voice file and the like, and displayed.

Meanwhile, when the control unit 140 does not sense the selection of the pop-up, in step 313, the control unit 140 automatically generates and displays the diary. At this time, the control unit 140 generates and displays the diary using all stored information.

Next, in a state in which the generated diary is displayed, in step 315, the control unit 140 determines whether a request for sharing the diary is received. Here, the request for sharing can be generated by a wireless network through a contact (e.g., a bump, such as a bump application scheme) or a proximity with another electronic device for sharing the diary according to a user's intention. Here, the wireless network can be Wi-Fi, BLUETOOTH, NFC, and the like. In addition, the other electronic device can be a portable terminal of another user. The other electronic device can be a refrigerator, a smart phone, a tablet, a cellular phone, a table PC, a washing machine, a microwave range, a television, a telephone, a notebook computer, a desktop computer and the like capable of recognizing the electronic pen 150. When the control unit 140 does not sense the request for sharing with the other electronic device, in step 319, the control unit 140 stores the generated diary in the diary application. Meanwhile, when the control unit 140 senses the request for sharing with the other electronic device, in step 317, the control unit 140 shares the diary with the other electronic device.

Figure 7:
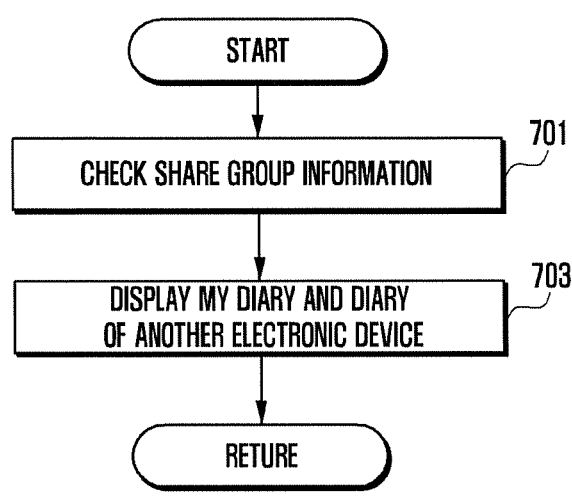
FIG. 7 illustrates a procedure for sharing a generated diary in an electronic device according to an embodiment of the present disclosure.
Figure 8:
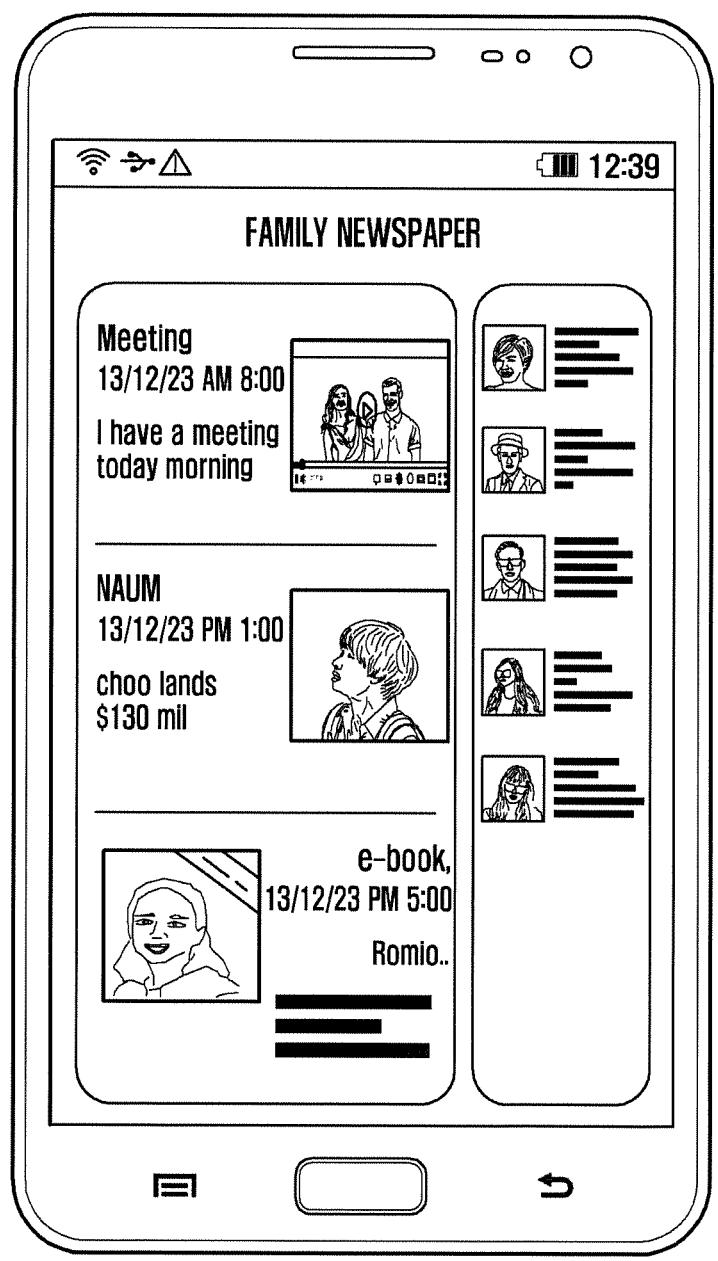
FIG. 8 illustrates an example of a screen in which a generated diary is shared in an electronic device according to an embodiment of the present disclosure.

FIG. 7 is a view illustrating a procedure of sharing a generated diary in an electronic device according to another embodiment of the present disclosure. FIG. 8 is a view illustrating an example of a screen in which a generated diary is shared in an electronic device according to another embodiment of the present disclosure.

Referring to FIGS. 7 and 8, in step 701, the control unit 140 checks share group information. Here, the share group information can be information of another electronic device stored for sharing the diary generated in own electronic device with a user of the other electronic device. Next, in step 703, the control unit 140 displays the user's (my) diary and a diary generated by the other electronic device in correspondence to a share request.

FIG. 8 is an example of a screen displaying a shared diary. The screen displaying the shared diary displays my diary in a portion (e.g., a left area) of the screen together with a diary requested to be shared from another electronic device in another portion (e.g., a right area) of the screen. At this time, the diary includes contents such as a text, an image, a video, a voice file and the like, and the diary is displayed.

As described above, the control unit 140 shares the diary with a desiring electronic device. Therefore, a problem in which a privacy is exposed to an undesirable range can be resolved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of generating a diary in an electronic device, the method comprising:
    displaying, by at least one processor, an application execution screen;
    receiving, by the at least one processor, a user input on the application execution screen;
    determining, by the at least one processor, whether the received user input is generated by an electronic pen or by a different object;
    collecting, by the at least one processor, information related to an application, when the received user input is generated by the electronic pen and corresponds to a predetermined gesture;
    storing, by the at least one processor, a shortcut address corresponding to the information related to the application;
    displaying a pop-up in response that a current time matches a predetermined time;
    displaying a list that displays the collected information related to the application and an edit item for each piece of collected information in the list when the pop-up is selected;
    editing the list based on a user input related to the edit item;
    generating and displaying, by the at least one processor, contents by using the shortcut address corresponding to the information related to the application based on the edited list, wherein contents are excluded for the piece of collected information based on the user input related to the edit item;
    displaying a contents share item; and
    sharing the generated contents with another electronic device when the contents share item is selected, wherein the contents comprise at least one of a text, an image, a video, or a voice file, corresponding to the stored information.

2. The method of claim 1, wherein the predetermined gesture comprises at least one of a physical button input of the electronic pen or hovering input of the electronic pen.

3. The method of claim 1, wherein the sharing of the generated contents with the other electronic device comprises:
    selecting at least one device among other devices that are set to be shared, and transmitting the generated contents to the at least one selected device; and
    if the electronic device receives information from at least one device among the other devices, generating contents based on the received information and displaying the contents in a portion of the application execution screen.

4. The method of claim 1, wherein the sharing the generated contents with the other electronic device comprises contacting and connecting with the other electronic device.

5. The method of claim 1, wherein the sharing the generated contents with the other electronic device comprises connecting with the other electronic device through a wireless network.

6. The method of claim 1, wherein generating and displaying the stored information comprises displaying at least one of a text, an image, a video, a voice file, an electronic book, or an Internet execution screen.

7. The method of claim 1, wherein the other electronic device is at least one of a refrigerator, a smartphone, a tablet, a cellular phone, a tablet PC, a washing machine, a microwave range, a television, a telephone, a notebook computer, or a desktop computer that are capable of recognizing the electronic pen.

8. An apparatus comprising:
    a memory configured to store information for generating contents;
    a touch panel; and
    at least one processor configured to:
        control the touch panel to display an application execution screen;
        receive a user input on the application execution screen by the touch panel;
        determine whether the received user input is generated by an electronic pen or by a different object;
        collect information related to an application when the received user input is generated by only the electronic pen and corresponds to a predetermined gesture;
        store a shortcut address corresponding to the information related to the application;
        display a pop-up in response that a current time matches a predetermined time;
        display a list that displays the collected information related to the application and an edit item for each piece of collected information in the list when the pop-up is selected;
        edit the list based on a user input related to the edit item;
        generate and display contents by using the shortcut address corresponding to the information related to the application based on the edited list, wherein contents are excluded for the piece of collected information based on the user input related to the edit item;
        display a contents share item; and
    share the generated contents with another electronic device when the contents share item is selected, wherein the contents comprise at least one of a text, an image, a video, or a voice file, corresponding to the stored information.

9. The apparatus of claim 8, wherein the predetermined gesture comprises at least one of a physical button input of the electronic pen or hovering input of the electronic pen.

10. The apparatus of claim 8, wherein the at least one processor is configured to connect with the other electronic device through a wireless network connection or contact when the selection of the contents share item is sensed.

11. The apparatus of claim 8, wherein the at least one processor is configured to:
    select at least one device among other devices that are set to be shared, and transmit the generated contents to the at least one selected device; and if the electronic device receives information from at least one device among the other devices, generate contents based on the received information and display the contents in a portion of the application execution screen.

12. The apparatus of claim 8, wherein the at least one processor is configured to display the generated contents comprising at least one of a text, an image, a video, a voice file, an electronic book, or an internet execution screen.

13. The apparatus of claim 8, wherein the at least one processor is configured to determine and share with at least one of a refrigerator, a smartphone, a tablet, a cellular phone, a tablet PC, a washing machine, a microwave range, a television, a telephone, a notebook computer, or a desktop computer that are capable of recognizing the electronic pen.

* * * * *